United States Patent
Laaksonen et al.

(10) Patent No.: US 11,917,392 B2
(45) Date of Patent: Feb. 27, 2024

(54) RENDERING OF AUDIO DATA FOR A VIRTUAL PLACE

(71) Applicant: Nokia Technologies Oy, Espoo (FI)

(72) Inventors: Lasse Laaksonen, Tampere (FI); Arto Lehtiniemi, Lempäälä (FI); Antti Eronen, Tampere (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 247 days.

(21) Appl. No.: 17/434,228

(22) PCT Filed: Feb. 12, 2020

(86) PCT No.: PCT/EP2020/053600
§ 371 (c)(1),
(2) Date: Aug. 26, 2021

(87) PCT Pub. No.: WO2020/173708
PCT Pub. Date: Sep. 3, 2020

(65) Prior Publication Data
US 2022/0167108 A1 May 26, 2022

(30) Foreign Application Priority Data
Feb. 27, 2019 (EP) .................................... 19159587

(51) Int. Cl.
*H04S 7/00* (2006.01)
*G06F 3/01* (2006.01)
*G06F 3/04815* (2022.01)

(52) U.S. Cl.
CPC .............. *H04S 7/303* (2013.01); *G06F 3/017* (2013.01); *G06F 3/04815* (2013.01); *H04S 2400/11* (2013.01); *H04S 2400/13* (2013.01)

(58) Field of Classification Search
None
See application file for complete search history.

(56) References Cited

U.S. PATENT DOCUMENTS

2019/0364377 A1* 11/2019 Valavanis ................ H04R 3/04
2021/0271315 A1* 9/2021 Jarvinen ................ A63F 13/573
2021/0286504 A1* 9/2021 Moore ..................... G06F 3/013

FOREIGN PATENT DOCUMENTS

EP 3264228 A1 1/2018
EP 3264259 A1 1/2018
(Continued)

OTHER PUBLICATIONS

Extended European Search Report received for corresponding European Patent Application No. 19159587.5, dated May 27, 2019, 7 pages.
(Continued)

*Primary Examiner* — Qin Zhu
(74) *Attorney, Agent, or Firm* — Nokia Technologies Oy

(57) ABSTRACT

An apparatus is disclosed comprising means for providing first positional data indicative of a first user position in a virtual space which comprises a plurality of audio objects. The means may also be for receiving, based at least partially on the first positional data, data indicative of a first allocation of the audio objects into a prioritized order or into one of a plurality of prioritized groups in which each group has a respective priority order, and receiving audio data associated with at least some of the audio objects. The means may also be for rendering the received audio data for at least some of the audio objects associated with the received audio data, based on the first allocation data, in which audio objects with a higher priority or in a higher priority group are rendered with priority over audio objects allocated with a lower priority or in a lower priority group.

18 Claims, 8 Drawing Sheets

(56) References Cited

FOREIGN PATENT DOCUMENTS

WO  2016/172111 A1  10/2016
WO  2017/220852 A1  12/2017
WO  2018/068234 A1  4/2018

OTHER PUBLICATIONS

International Search Report and Written Opinion received for corresponding Patent Cooperation Treaty Application No. PCT/EP2020/053600, dated May 25, 2020, 11 pages.
Office action received for corresponding European Patent Application No. 19159587.5, dated Jun. 28, 2022, 5 pages.

\* cited by examiner

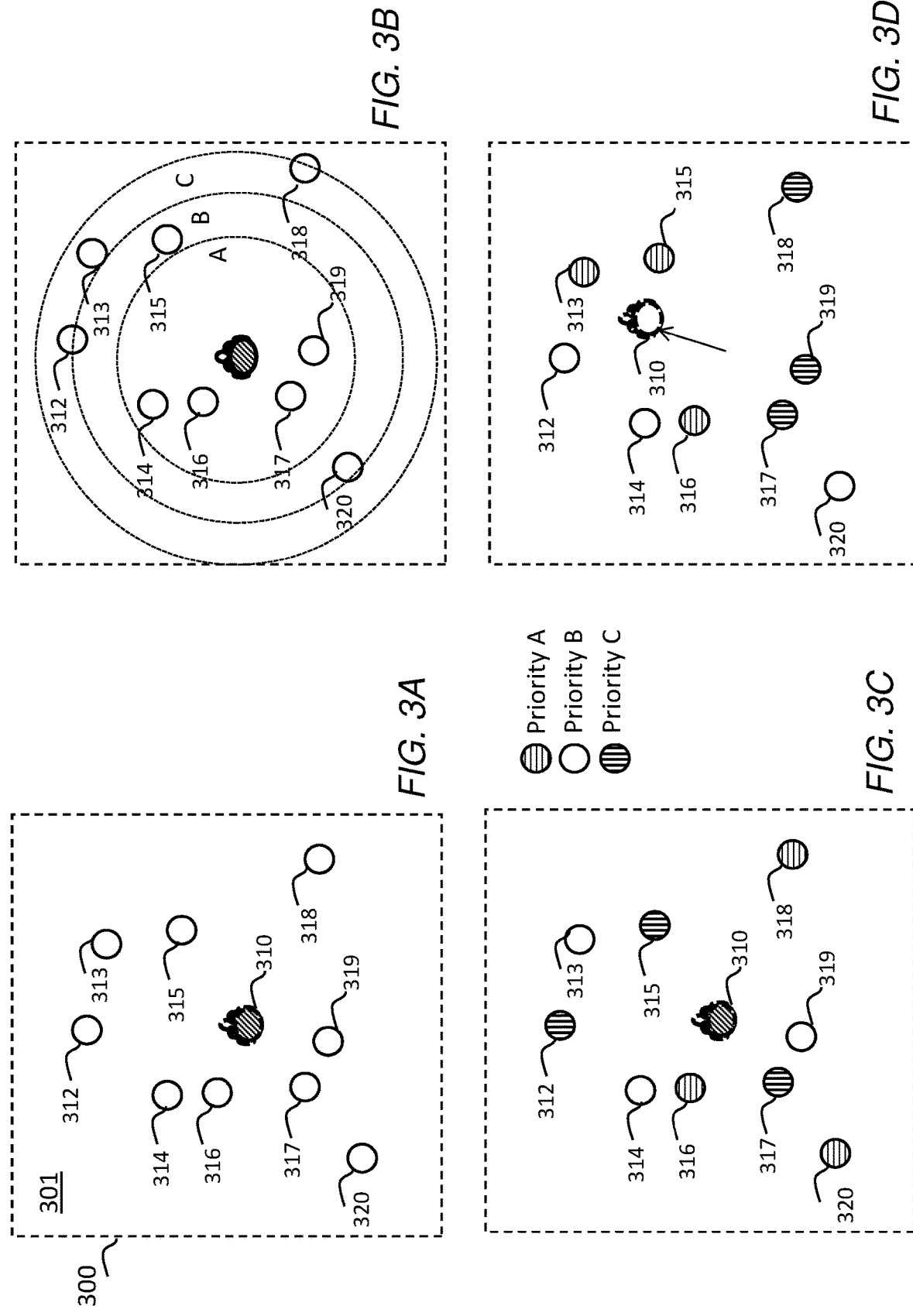

RENDERING OF AUDIO DATA FOR A VIRTUAL PLACE

RELATED APPLICATION

This application claims priority to PCT Application No. PCT/EP2020/053600, filed on Feb. 12, 2020, which claims priority to EP Application No. 19159587.5, filed on Feb. 27, 2019, each of which is incorporated herein by reference in its entirety.

FIELD

Example embodiments relate to the rendering of audio data for a virtual space.

BACKGROUND

The term extended reality (XR) is sometimes used as a generic term to cover various technologies providing real-and-virtual combined environments. These may include virtual reality (VR), augmented reality (AR) and mixed reality (MR) technologies.

Virtual reality (VR) is a rapidly developing area of technology in which video and/or audio content is provided to a user device, such as a headset. As is known, the user device may be provided with a live or stored feed from a content source, the feed representing a virtual space or world for immersive output through the user device. In some example embodiments, the audio may be spatial audio. A virtual space may be any computer-generated version of a space, for example a captured real world space, in which a user can be immersed through the user device. For example, a virtual reality headset may be configured to provide virtual reality video and/or audio content to the user, e.g. through the use of a pair of display screens and/or headphones incorporated within the headset. The virtual space may be larger than the visual field of the user and hence the user is shown only a part or portion of the virtual space. The part or portion content may be based on the position of the user device and is referred to generally as "the viewport."

Position and/or movement of the user device can enhance the immersive experience. Some virtual reality headsets use so-called three degrees of freedom (3DoF) which means that the head movement in the yaw, pitch and roll axes are measured and determine what the user sees and/or hears. This facilitates the scene remaining largely static in a single location as the user rotates their head. A next stage may be referred to as 3DoF+ which may facilitate limited translational movement in Euclidean space in the range of, e.g. tens of centimetres, around a location. A yet further stage is a six degrees-of-freedom (6DoF) virtual reality system, where the user is able to freely move in the Euclidean space and rotate their head in the yaw, pitch and roll axes. Six degrees-of-freedom virtual reality systems and methods will enable the provision and consumption of volumetric virtual reality content.

Volumetric virtual reality content comprises data representing spaces and/or objects in three-dimensions from all angles, enabling the user to move fully around the spaces and/or objects to view them from any angle. For example, a person or object may be fully scanned and reproduced within a real-world space. When rendered to a virtual reality headset, the user may 'walk around' the person or object and view and/or hear them from the front, the sides and from behind. Users may also be able to interact with other objects, for example virtual objects (e.g. a computer-generated person or object or service) or real objects (e.g. another person involved in the same virtual scene.)

For the avoidance of doubt, references to virtual reality (VR) are also intended to cover related technologies such as augmented reality (AR) and mixed reality (MR) within the general field of extended reality (XR.)

SUMMARY

According to an example embodiment, there is provided an apparatus comprising means for: providing first positional data indicative of a first user position in a virtual space which comprises a plurality of audio objects; receiving, based at least partially on the first positional data, data indicative of a first allocation of the audio objects into a prioritized order or into one of a plurality of prioritized groups in which each group has a respective priority order; receiving audio data associated with at least some of the audio objects; rendering the received audio data for at least some of the audio objects associated with the received audio data, based on the first allocation data, in which audio objects with a higher priority or in a higher priority group are rendered with priority over audio objects allocated with a lower priority or in a lower priority group.

The means may be further configured to provide updated positional data indicative of one or more of a second, different, user position, to receive, based on the updated positional data, data indicative of a second, different allocation of the audio objects into a different prioritized order or into prioritized groups whereby at least one object present in a first group for the first allocation is changed to a second group for the second allocation, and to render the received audio data based on the second allocation data.

The received allocation data may allocate audio objects of a corresponding type to a common priority group.

The received allocation data may allocate audio objects comprising speech related to a conversation to a common priority group such that either all or no audio objects are rendered, depending on whether said common priority group is able to be rendered or not.

The means may be further configured to enable local modification of the received allocation data to modify the allocation of audio objects in the prioritized order or within the prioritized groups from that indicated by the received allocation data.

The means may be configured to receive data representing one or more characteristics of a region in the virtual space corresponding to the current user position, and to modify locally the received allocation data dependent at least partially on the one or more characteristics.

The data representing one or more characteristics of the region may represent one or more of a distance of one or more audio objects from the user position, a presence of an obstruction in the virtual space, a type of obstruction in the virtual space, reverberation characteristics and noise levels.

The means may be further configured to provide an editing mode in which a user interface is presented indicating audio objects and their respective prioritized order or group allocation, and to receive one or more user inputs to change the prioritized order of at least one audio source or change it from a first group to a second group.

The means may be configured such that the user interface comprises a paused version of the virtual space rendered to the user at a time when the editing mode is selected, the user interface including visual representations of the audio objects in the virtual space, and wherein the one or more user inputs are gesture or drag-based inputs for modifying the allocation.

The means may be further configured to identify one or more audio objects as being of interest to the user, based on one or more of user behaviour and context when consuming the virtual space, and setting the allocation of said one or more audio objects to the same or to a higher priority order or group for other positions such that they will continue to be rendered.

The means may be configured to provide the positional data to a remote device over a network and the data indicative of the allocation(s) of audio objects is metadata received with the audio data from the remote device, or caused to be sent by the remote device, over the network.

According to another example embodiment, there is provided an apparatus comprising means for: receiving, from a remote apparatus, first positional data indicative of a first user position in a virtual space which comprises a plurality of audio objects; transmitting, or causing to be transmitted to the remote apparatus, based at least partially on the first positional data, data indicative of a first allocation of the audio objects into a prioritized order or into one of a plurality of prioritized groups, in which each group has a respective priority order; and transmitting, or causing transmission to the remote apparatus of audio data associated with at least some of the audio objects for rendering at the remote apparatus based on the first allocation data.

The means may comprise: at least one processor; and at least one memory including computer program code, the at least one memory and computer program code configured to, with the at least one processor, cause the performance of the apparatus.

According to another example embodiment, there is provided a method comprising: providing first positional data indicative of a first user position in a virtual space which comprises a plurality of audio objects; receiving, based at least partially on the first positional data, data indicative of a first allocation of the audio objects into a prioritized order or into one of a plurality of prioritized groups in which each group has a respective priority order; receiving audio data associated with at least some of the audio objects; rendering the received audio data for at least some of the audio objects associated with the received audio data, based on the first allocation data, in which audio objects with a higher priority or in a higher priority group are rendered with priority over audio objects allocated with a lower priority or in a lower priority group.

According to another example embodiment, there is provided a non-transitory computer readable medium comprising program instructions stored thereon for performing a method, comprising: providing first positional data indicative of a first user position in a virtual space which comprises a plurality of audio objects; receiving, based at least partially on the first positional data, data indicative of a first allocation of the audio objects into a prioritized order or into one of a plurality of prioritized groups in which each group has a respective priority order; receiving audio data associated with at least some of the audio objects; rendering the received audio data for at least some of the audio objects associated with the received audio data, based on the first allocation data, in which audio objects with a higher priority or in a higher priority group are rendered with priority over audio objects allocated with a lower priority or in a lower priority group.

According to another example embodiment, there is provided a method comprising: receiving, from a remote apparatus, first positional data indicative of a first user position in a virtual space which comprises a plurality of audio objects; transmitting, or causing to be transmitted to the remote apparatus, based at least partially on the first positional data, data indicative of a first allocation of the audio objects into a prioritized order or into one of a plurality of prioritized groups, in which each group has a respective priority order; and transmitting, or causing transmission to the remote apparatus of audio data associated with at least some of the audio objects for rendering at the remote apparatus based on the first allocation data.

According to another example embodiment, there is provided a non-transitory computer readable medium comprising program instructions stored thereon for performing a method, comprising: receiving, from a remote apparatus, first positional data indicative of a first user position in a virtual space which comprises a plurality of audio objects; transmitting, or causing to be transmitted to the remote apparatus, based at least partially on the first positional data, data indicative of a first allocation of the audio objects into a prioritized order or into one of a plurality of prioritized groups, in which each group has a respective priority order; and transmitting, or causing transmission to the remote apparatus of audio data associated with at least some of the audio objects for rendering at the remote apparatus based on the first allocation data.

According to another example embodiment, there is provided a computer program product comprising a set of instructions which, when executed on an apparatus, is configured to cause the apparatus to carry out the method of providing first positional data indicative of a first user position in a virtual space which comprises a plurality of audio objects; receiving, based at least partially on the first positional data, data indicative of a first allocation of the audio objects into a prioritized order or into one of a plurality of prioritized groups in which each group has a respective priority order; receiving audio data associated with at least some of the audio objects; rendering the received audio data for at least some of the audio objects associated with the received audio data, based on the first allocation data, in which audio objects with a higher priority or in a higher priority group are rendered with priority over audio objects allocated with a lower priority or in a lower priority group.

According to another example embodiment, there is provided a computer program product comprising a set of instructions which, when executed on an apparatus, is configured to cause the apparatus to carry out the method of receiving, from a remote apparatus, first positional data indicative of a first user position in a virtual space which comprises a plurality of audio objects; transmitting, or causing to be transmitted to the remote apparatus, based at least partially on the first positional data, data indicative of a first allocation of the audio objects into a prioritized order or into one of a plurality of prioritized groups, in which each group has a respective priority order; and transmitting, or causing transmission to the remote apparatus of audio data associated with at least some of the audio objects for rendering at the remote apparatus based on the first allocation data.

In the above, audio data associated with at least some of the audio objects may mean audio data representing at least some of the audio objects. In the above, audio objects with a higher priority or in a higher priority group may, for example, be rendered with priority over audio objects allocated with a lower priority or in a lower priority group in the event that not all audio objects are able to be rendered. Other examples are possible, not necessarily based on the ability to render some or all audio objects.

DRAWINGS

Example embodiments will now be described, by way of non-limiting example, with reference to the accompanying drawings, in which:

FIGS. 3A-3D are top plan schematic views of a virtual scene comprising a virtual space in which a user is immersed at different stages in accordance with example embodiments;

DETAILED DESCRIPTION

Figure 1:
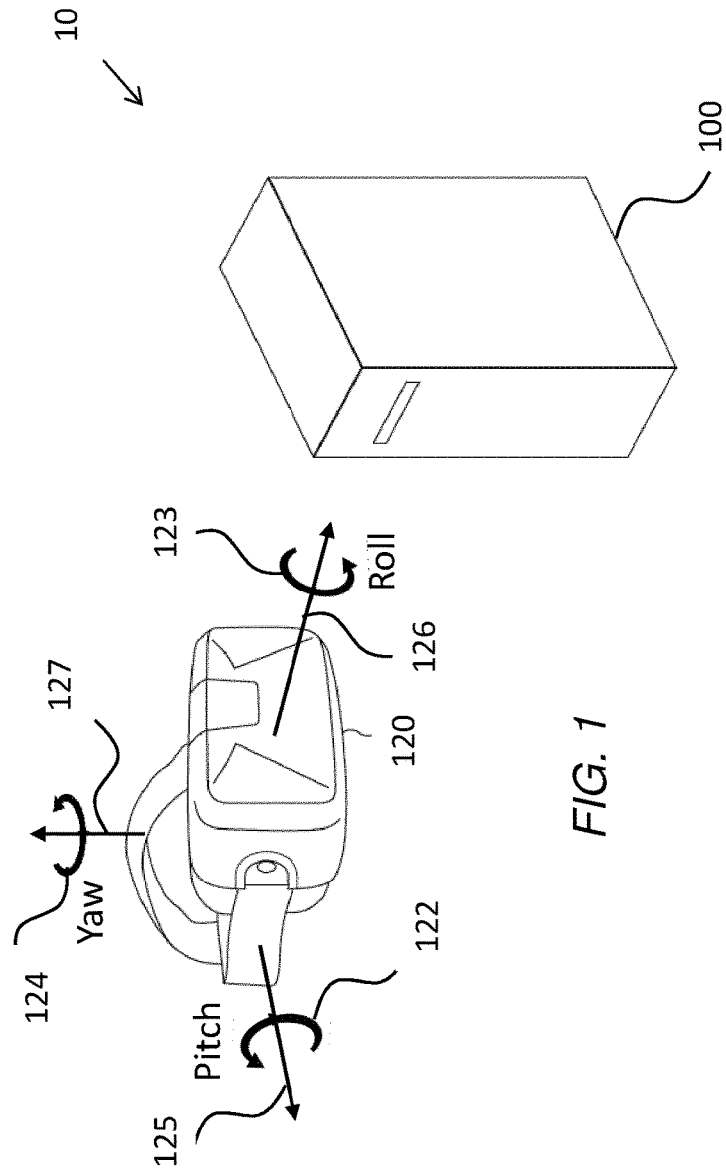
FIG. 1 is a perspective view of user end equipment for receiving immersive media content.

In the description and drawings, like reference numerals refer to like elements throughout.

Embodiments herein relate to immersive media based on extended reality (XR) technologies, such as for example virtual reality (VR), and in particular to processing methods and systems for providing audio and possibly video data representing a virtual space. The virtual space may be generated based on capturing video and sounds from a real-world space. The virtual space may alternatively be computer-generated. The virtual space may also be a combination of a computer-generated and a real-world space. Embodiments are applicable to any form of immersive multimedia methods or systems. Such methods and systems are applicable to any type of extended reality (XR) technology, including Virtual Reality (VR), Augmented Reality (AR) and mixed reality (MR).

Example embodiments may relate to the provision of virtual content based on a user position within a virtual space, whereby the virtual content comprises a plurality of audio objects which may be specific audio objects, sometimes referred to audio sources or sound sources. In other words, they may be objects or regions of the virtual space that emit audible sound. For example, a virtual space representing a concert involving a band composed of multiple members may comprise an audio object corresponding to each of one or more members of the band (vocals) and possible one or more instruments. Example embodiments may involve receiving, based at least partially on the positional data, allocation data indicating an allocation of the audio objects (which may be all or only some of the audio objects) in the scene or overall virtual space to a prioritized order or into one of a plurality of prioritized groups, e.g. G1, G2, . . . Gn. Each group may have a respective priority order P1, P2, . . . Pn which may determine the priority in which audio data representing or associated with the audio objects are fetched from the source of virtual content and/or rendered by a user device to the requesting user. So, a set of allocation data may allocate objects O1, O2 and O5 respectively to the priority order P1, P3, P2 (meaning that the first object O1 has priority over O5 and both have priority over O2.) Similarly, a set of allocation data may allocate objects O1, O2, and O5 to a first group G1, and objects O3, O4 and O6 to a second group G2. If the first group G1 has priority over the second group G2, then audio data representing or corresponding to objects O1, O2 and O5 may be fetched, received and/or rendered with priority over objects O3, O4, O6.

In this way, there may be a degree of directorial or creator control over what is rendered at particular position within the virtual space. Alternatively, or additionally, updates to the allocation data may change dynamically, for example based on objects or regions of interest to the user, or other factors. Alternatively, or additionally, updates to the allocation data may change based on changes specified locally by the user in a so-called "editing mode."

For example, where there is some limitation in terms of how many objects can be rendered at once, for example a system limitation based on bandwidth between a user device and the source of the virtual content, and/or because the user device has limited rendering capability, then audio objects appropriate to the context or meaning of the scene can be received, fetched and/or rendered over ones considered less appropriate. Where there are fewer limitations, the audio data corresponding to the next priority group can be received, fetched and/or rendered and so on. In some cases, an "all or nothing" approach may be applied in the sense that either all audio objects in a group are rendered or not. This may be useful where the audio objects allocated to a common priority group represent part of a speech conversation; failure to render just one audio object involved in the conversation will distort and potentially destroy the meaning of the conversation. Hence, if such an audio object cannot be rendered, then it may be determined that none of the other objects in that priority group should be rendered. In some cases, an object or group of objects with the highest priority may be rendered if it is determined that there is no capacity to render all of them, or the closest one or more objects to the user may be rendered, or all but the one or more lowest priority objects may be rendered. In some cases, an object or group of objects with the highest priority or in the highest priority group may be locked to a user's position in the virtual space, such that the corresponding audio data may follow the user regardless of where they move, which may be limited to a particular region of the virtual space and/or for a particular time frame.

The audio data representing or associated with audio objects may be provided in any suitable form and may be provided with or without accompanying video data. For example, the audio data may represent vocals or speech emanating from a human audio object or instrumental sound produced by a musical instrument. The audio data may be captured or computer-generated, e.g. synthesised.

The allocation data may comprise metadata that may be sent separate from, or with, the audio data representing or associated with the audio objects.

Example embodiments may also relate to providing updated positional data indicative of one or more of a second, different, user position, and to receive, based on the updated positional data, data indicative of a second, different allocation of the audio objects into a different prioritized order or into prioritized groups. At least one object present in a first group for the first allocation may change to a second group for the second allocation, and the received audio data may be rendered based on the second allocation data.

Example embodiments may provide a dynamically layered preference order for implementing so-called perceptual scopes in extended reality (XR) applications, for example within a 6DoF system whereby the user's position within the virtual space may change in various dimensions. Perceptual scoping is a name given to the concept of controlling the amount of content being rendered to a user based on their current position in a virtual space. In this regard, the term position is intended to cover not only translational (X, Y, Z) position in a virtual space, but also rotation or orientation. The term position, and hence position data or positional data, is intended also to cover data indicative of the rotation or orientation of a user. Embodiments herein may aim to avoid situations where audio objects which may be of interest to a user, or meaningful to the type or nature of content they are consuming, disappear as a result of limiting the amount of content being rendered, whether for reasons of system or channel limitations or otherwise.

The term "consumed", "consuming" or "consumption" may be used herein to refer to the act of viewing or hearing a portion of virtual content, i.e. that which is being output to the user; if the virtual content data is video/image data, then that part of the video/image data which is rendered and made viewable to the user is that which is being consumed. Similarly, if the virtual content data is audio data, then that part of the audio scene which is rendered and made audible to the user is that which is being consumed. It is assumed that, at any one time, only a part of an overall virtual scene is being consumed based, for example, on what the creator or director of the virtual content wishes to the user to see or hear, and/or on what the user wishes to see or hear by exploring the virtual content within which they are immersed. The part or portion of the virtual content may be based on the position of the user device and is referred to generally as "the viewport."

The term "rendering" may cover the process of converting data representing a virtual space (whether video or audio) into the visual or audio output that a user can see or hear.

FIG. 1 is a schematic illustration of a virtual reality display system 10 which represents user-end equipment. The virtual reality display system 10 includes a user device in the form of a virtual reality headset 120, for displaying video/image data representing a virtual space, and a virtual reality media player 100 for rendering the video/image data on the virtual reality headset 120. In some embodiments, a separate user control (not shown) may be associated with the virtual reality display system 10, e.g. a hand-held controller. Headset 120 may be referred to as a virtual reality headset or a head-mounted display (HMD).

In the context of this specification, a virtual space or world or an immersive space is any computer-generated version of a space, for example a captured real world space, in which a user can be immersed, or possibly an artificial space created using suitable software. The virtual reality headset 120 may be of any suitable type. The virtual reality headset 120 may be configured to provide virtual reality video, image and audio content data to a user. As such, the user may be immersed in virtual space.

The virtual reality headset 120 may receive the virtual reality video/audio data from the virtual reality media player 100. The virtual reality media player 100 may be part of a separate device which is connected to the virtual reality headset 120 by a wired or wireless connection. For example, the virtual reality media player 100 may include a games console, a laptop or a Personal Computer (PC) configured to communicate visual data to the virtual reality headset 120.

Alternatively, the virtual reality media player 100 may form part of the virtual reality headset 120 or other user display device.

Here, the virtual reality media player 100 may comprise a head mounted display, TV, mobile phone, smartphone or tablet computer configured to play content through its display. For example, the virtual reality media player 100 may be a touchscreen device having a large display over a major surface of the device, through which video content can be displayed. The virtual reality media player 100 may be inserted into a holder of a virtual reality headset 120. With such virtual reality headsets 120, a smart phone or tablet computer may display the video data which is provided to a user's eyes via respective lenses in the virtual reality headset 120. The virtual reality display system 10 may also include hardware configured to convert the device to operate as part of virtual reality display system 10. Alternatively, the virtual reality media player 100 may be integrated into the virtual reality headset 120 or other user display device. The virtual reality media player 100 may be implemented in software. In some embodiments, a device comprising VR media player software is referred to as the virtual reality media player 100.

The virtual reality display system 10 may include means for determining the spatial position of the user and/or orientation of the user's head. This may be by means of determining the spatial position and/or orientation of the virtual reality headset 120. Orientation of the virtual reality headset 120 may be for example represented by yaw 124, pitch 122, and roll 123; that is, rotations about corresponding axes 127, 125, 126, as illustrated in FIG. 1. Over successive time frames, a measure of position and/or movement may therefore be calculated and stored. Such means may comprise part of the virtual reality media player 100. Alternatively, the means may comprise part of the virtual reality headset 120. For example, the virtual reality headset 120 may incorporate motion tracking sensors which may include one or more of gyroscopes, accelerometers and structured light systems. These sensors generate position data from which a current visual field-of-view (FOV) is determined and updated as the user, and so the virtual reality headset 120, changes position and/or orientation. The visual field-of-view at a particular time may be referred to as the viewport, that is a region of omnidirectional image or video suitable for display and viewing by the user. Content shown in the viewport depends on user position and orientation (and possibly gaze). The virtual reality headset 120 may comprise two digital screens for displaying stereoscopic video images of the virtual world in front of respective eyes of the user, and also two speakers for delivering audio from the virtual reality media player 10. In some embodiments, the virtual reality headset 120 may comprise a single digital screen having separate regions intended for each eye of the user. The embodiments herein, which primarily relate to the delivery of extended reality (XR) content, are not limited to a particular type of virtual reality headset 120.

In some embodiments, the virtual reality display system 10 may include means for determining the gaze direction of the user. In some embodiments, gaze direction may be determined using eye gaze tracking sensors provided in the virtual reality headset 120. The eye gaze tracking sensors may, for example, be miniature cameras installed proximate the video screens which identify in real-time the pupil position of each eye. In some embodiments, the eye gaze tracking system may include infrared light emitting diodes that illuminate the eye cornea resulting in better detection of the pupil contour and producing corneal reflections such as glints that can be detected by the miniature cameras and be used as a means to increase the gaze tracking accuracy and robustness. The identified positions may be used to determine which part of the current visual FOV is of interest to the user. This information can be used for example to identify one or more sub-sets of content within the video data, e.g. objects or regions projected at a particular depth within the content. For example, the convergence point of both eyes may be used to identify a reference depth.

The virtual reality display system 10 may be configured to display virtual reality video/audio data to the virtual reality headset 120 based on spatial position and/or the orientation of the virtual reality headset. A detected change in spatial position and/or orientation, i.e. a form of movement, may result in a corresponding change in the visual data and audio data to reflect a position or orientation transformation of the user with reference to the virtual space. This allows virtual reality content data to be consumed with the user experiencing a stereoscopic or a 3D virtual reality environment and within which the user may explore the virtual space, possibly with 6DoF.

Audio data may also be provided to headphones or speakers provided as part of the virtual reality headset 120. The audio data may represent spatial audio source content. Spatial audio may refer to directional rendering of audio in the virtual space such that a detected change in the user's spatial position or in the orientation of their head may result in a corresponding change in the spatial audio rendering to reflect a transformation with reference to the space in which the spatial audio data is rendered.

The angular extent of the environment observable through the virtual reality headset 120 is the viewport. The actual field of view observed by a user depends on the inter-pupillary distance and on the distance between the lenses of the virtual reality headset 120 and the user's eyes, but the field of view can be considered to be approximately the same for all users of a given display device when the virtual reality headset is being worn by the user.

Figure 2:
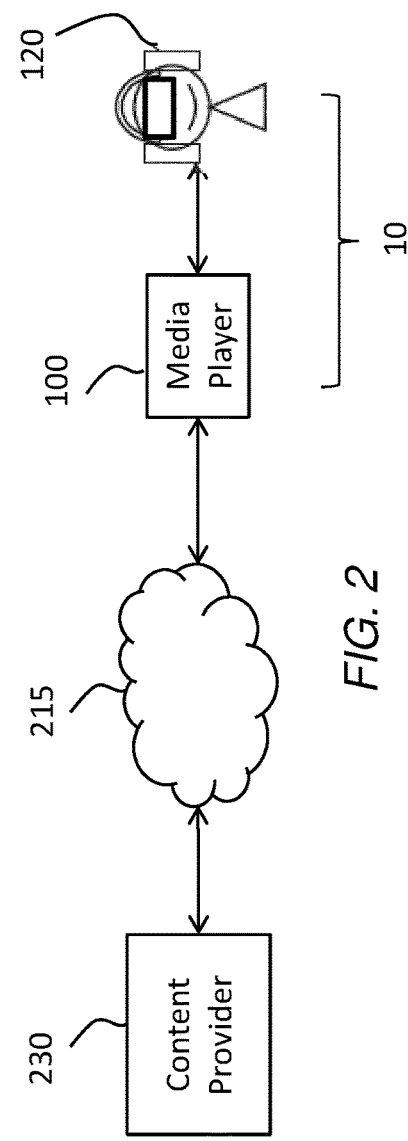
FIG. 2 is a schematic view of a system for transmitting and receiving immersive media content.

Referring to FIG. 2, a remote content provider 230 may store content data for output to the virtual reality headset 120. Although streaming from the remote content provider 230 is described below as an example embodiment, alternatively, the virtual reality headset 120 (or other user device, if used) may store the content data, without the need for streaming.

Responsive to receive or download requests sent by the virtual reality media player 100, the content provider 230 may stream the virtual reality data over a data network 215, which may be any network, for example an IP network such as the Internet. The data network 215 may be also a unidirectional network such as a multicast network or a broadcast network.

The remote content provider 230 may or may not be at the location or system where the virtual reality video is captured, created and/or processed.

For illustration purposes, we may assume that the content provider 230 also captures, encodes and stores the virtual reality content, as well as streaming it responsive to signals from the virtual reality display system 10. The virtual reality content may be captured using one or more cameras or possibly an omnidirectional camera. One or more microphones may be provided, either separate from, or as part of the camera, for providing audio signals which may be incorporated into the spatial content data. The audio signals may comprise a multichannel audio input in a loudspeaker format. Such formats may include, but are not limited to, a stereo signal format, a 4.0 signal format, 5.1 signal format and a 7.1 signal format. In such examples, the signals may have been pre-processed from their original raw format into the loudspeaker format. Alternatively, in other examples, audio signals may be in a multi-microphone signal format, such as a raw eight channel input signal. The raw multi-microphone signals may, in some examples, be pre-processed by using spatial audio processing techniques thereby to convert the received signals to loudspeaker format or binaural format. Down mixing may also be performed to limit the audio signal to, for example, four channel loudspeaker format. Alternatively, in other examples, audio signals may be received as ambisonics or audio objects.

Audio data may be associated with individual audio objects in the virtual space represented by content data.

Referring now to FIG. 3A there is shown a top plan view of a virtual scene 300 comprising a virtual space 301 in which a user 310 is immersed and may explore with 6DoF. The space 301 comprises nine audio objects 312-320 which may represent any type of audio object, whether people, static objects, moving objects etc. Each of the audio objects 312-320 has associated audio data that may or may not be rendered at a particular time. Based on the user's current position data, they may see and/or hear only a part of the virtual space 301 via a viewport. Sometimes they may hear audio data from outside of their viewport.

In accordance with an example embodiment, FIG. 3B shows the FIG. 3A top plan view of the virtual space 301 in which the space has been divided into a number of sub-spaces comprising concentric circles or layers A, B, C. In an example embodiment the audio objects 312-320 may be allocated to prioritized groups based on distance from the user 310. Therefore, each group may correspond to each sub-space or layer A, B, C and members of the groups may comprise the audio objects 312-320 whose position falls within each layer. So, group A may have members comprising audio objects 314, 316, 317, 319, group B may have members 315, 320 and group C may have members 312, 313, 318. Group A may have priority over groups B and C and group B may have priority over group C. This allocation may be defined in first allocation data received by the virtual reality system 10 which determines that, depending on system conditions, audio data representing or corresponding to the audio objects 314, 316, 317, 319 should be rendered first, and then, if conditions permit, the audio data representing or corresponding to audio objects 315, 320 may also be rendered, and so on. In some examples, an all or nothing approach may be adopted, whereby if one member of a group cannot be rendered for any reason, then none are rendered.

It should be understood that some embodiments do not require the allocation data to provide prioritized groups. For example, the allocation order may simply define a prioritized order for one or more individual audio objects 312-320. For example, a first audio object 312 may have the highest priority and a ninth audio object 320 may have the lowest priority, with intermediate audio objects 313-319 having respective intermediate priorities. In some embodiments, a mix of individual and grouped prioritization orders may be used. For example, the first audio object 312 may have the highest priority and a ninth audio object 320 may have the lowest priority, with all intermediate audio objects 313-319 being in a common group having lower priority than the first audio object but higher priority than the ninth audio object.

Allocating at least one audio object with an individual priority, e.g. the highest priority, and fixing that priority for a certain spatial region and/or time frame, may be used to ensure that audio data representing or corresponding to that audio object will effectively follow the user within said spatial region and/or time frame, thereby maintaining for example an important level of context or meaning to a virtual scene.

The allocation data need not be based on distance of an audio object 312-319 from the user 310. In a difference scenario, FIG. 3C represents different allocation data whereby different shadings are used to indicate the prioritization groups for the current user position. Here, it will be seen that audio objects 316, 318, 320 are allocated to group A, having the highest priority order, audio objects 313, 314, 319 are allocated to group B, having the next-highest priority order, and audio objects 312, 315, 317 are allocated to the lowest priority order. This allocation data may reflect that the group A objects 316, 318, 320 are important in context and may relate, for example, to audio objects involved in a conversation.

Referring now to FIG. 3D, responsive to a change in user position, by virtue of position data corresponding to said new position or movement, new allocation data may be received from the virtual reality system 10 to reflect the change. Here, group A now comprises the audio objects 313, 315, 316, group B the audio objects 312, 314, 320 and group C the audio objects 317, 318, 319. In this case, only the audio object 316 remains in the highest priority group A compared with the FIG. 3C situation, indicating that audio data representing or corresponding to this object remains important for this user's position.

The dynamic updating of the allocation data based on user position may also take into account factors such as interests of the user 310. For example, if an audio object is determined to be of interest to the user, which can be determined in a variety of ways, including using preference data, historical browsing or navigation data, gaze direction data, a learning model and so on, then that audio object maybe fixed to its current, high priority order or high-priority group, and/or even promoted to a higher priority or higher-priority group (or new group created) to account for the level of interest. Therefore, allocation of audio objects 312-320 is not necessarily determined manually by a director or creator in advance. In some embodiments, automatic and dynamic allocations are made based on data fed-back from the user device regarding their interests and/or activity and possibly also based on user-provided feedback. In some embodiments, machine learning techniques may be utilized to refine a learning model, for example to allocate one or more audio objects 312-320 to a classification group which corresponds to the prioritized order. To give an example, if during the consumption of the virtual space, the user's position (spatial, orientation and/or gaze) corresponds to them concentrating on a conversation between three audio objects, then notwithstanding that said audio objects may be in a lower priority group, they may be promoted to the highest priority group based on the detected user interest. In another example, a level of interest may be based on how close the user 310 is to one or more objects 312-320, e.g. within a threshold distance, and possibly dependent on the amount of time they are at that distance. Thus, in the event of some system limitation, for example due to additional objects entering the scene and therefore utilizing bandwidth and/or rendering resources, the conversation may be maintained and the additional objects de-emphasized in some way, e.g. lowering the volume of their audio and/or the like. This may be maintained even if one of said audio sources moves outside of the current viewport.

At the allocating part of the network, e.g. the virtual reality system 10, different sets of allocation data may be provided for different users. Thus, the allocation data that is provided to a first user may be different from that provided to a second user, even based on corresponding virtual spaces and positions. Different users may over time have different interests and/or may spend different amounts of time navigating and/or interacting with different parts of the space. By learning a user's behaviour and interests over time, a learning model corresponding to each user may be updated and tailored, and hence the allocation data may be particular to the different users. The learning model may be stored, for example, on the user device, a network server and/or the like. The learning model for the user may be updated as the user experiences a virtual scene, and later received from the server or fetched from the memory of the user device.

In an example embodiment, user's device, e.g. media player 100, may store a recording of a virtual scene containing audio objects associated with audio data. The media player 100 may have received the content of the recording from a content provider 230, for example from a server in a network. Upon playback of the recording, the user may interact with the audio objects as described in relation to FIGS. 3A-3D, FIG. 4 and FIG. 5. User's device may thus control the prioritization of the audio objects, for example, according to user's behaviour when interacting with the audio objects, or by user's direct editing of the recording's audio scene. User's device may store prioritization modifications done by the user. User's device may instead or in addition to, upload the prioritization modifications to a network server. User's device may then receive the modified audio scene when later playing back the same modified recording. In this example, the user is able to, for example, concentrate on certain audio objects and, while moving within the recorded content, keep hearing those audio objects. Later on, the user may have similar experience when moving around within the same content. User device may also offer the possibility to reset the modifications. In this way, the audio scene is returned to the originally recorded. This can be useful when a plurality of different users use the same user device to playback a virtual scene recording.

In some embodiments, prioritized groups may be based on thematic concepts. For example, audio sources corresponding to participants of a common conversation or members of a band may be allocated to the same group to maintain consistency and meaning to the consumed part of the virtual space. For example, in a band comprising multiple audio sources, each producing respective vocals/instrumentals to a song, the more influential audio sources (e.g. lead vocals, bass, percussion) may be in a higher priority group than, say, background vocals.

In some embodiments, modifications to received allocation data can be made, or caused to be made, from the user side of the network, for example at the virtual reality headset 120 and/or the virtual reality media player 100. In some embodiments, the user may initiate a so-called "editing mode."

The editing mode may permit the consuming user 321 to flag one or more audio objects 312-320 as desirable or undesirable, of interest or not of interest, either in absolute terms of relative terms.

For example, the user 321 may utilize the editing mode whilst consuming the virtual space 301. When invoked, the virtual space 301 seen through the viewport may either continue or may be paused. If paused, the user 321 may be shown looped previous content. (in case of pausing, the user may be, e.g., looped previous content).

For example, the user 321 may be shown either an inclusive or exclusive scoping, where some currently-available content is removed such that a reduced presentation is achieved. The scene presentation may be "rotated", e.g., such that each layer is covered.

Figure 4:
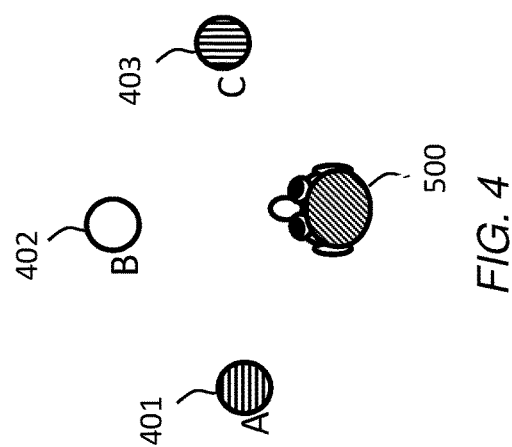
FIG. 4 is a top plan schematic view of a user in relation to virtual objects, for understanding an editing mode in accordance with example embodiments.

FIGS. 4 and 5 illustrate both types of scoping. FIG. 4 shows a scenario of a user 500 in a virtual space, prior to entering the editing mode. The virtual space here comprises three audio objects 401-403 having respective priorities A, B and C in highest to lowest priority order.

Figure 5B:
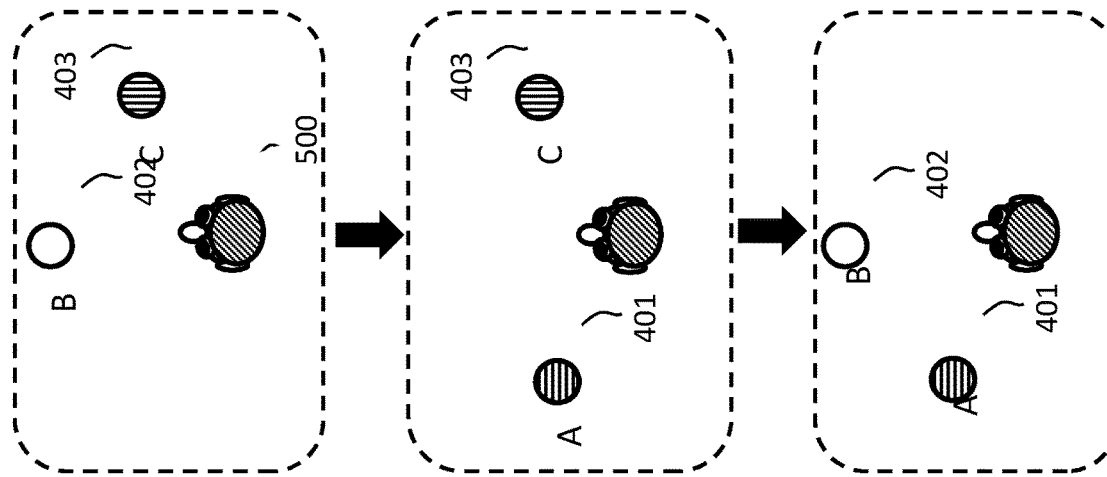
FIGS. 5A-5C are top plan schematic views of a user in relation to virtual objects, for understanding another editing mode in accordance with example embodiments.
Figure 5A:
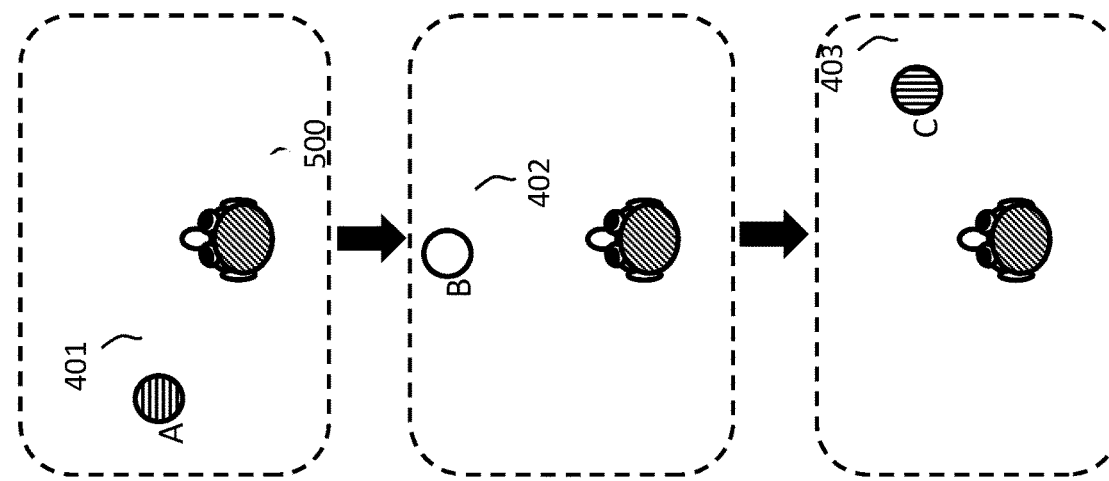

Upon entering an inclusive editing mode, only a certain priority group (or in a very simple scene, only a single audio source) is presented to the user 500 at a time to permit setting or adjustment to the constituent object or objects. As shown in FIG. 5A, the user 500 may scroll or otherwise alternate through the different audio objects or prioritized groups to understand what objects have what order.

Upon entering an exclusive editing mode, only a certain priority group (or in a very simple scene, only a single audio source) is dropped from the presentation to the user 500. As shown in FIG. 5B, the user 500 may scroll or otherwise alternate through the different audio objects or prioritized groups to understand what objects have what order.

During such editing mode presentation, the user 500 may indicate via a user interface or through gestures whether a certain perceptual layer content, a directional audio component, an audio source, or a change in audio, for example, is desirable or undesirable for the user. In this way, the user 500 may rank or flag content. In some further examples, the user 500 may be presented with a visualization of the various ordered audio sources, whether using shading, layering or some other way of distinguishing the order or groupings. For example, during an editing mode presentation, the user 500 can drag content from one layer to another one.

Figure 5C:
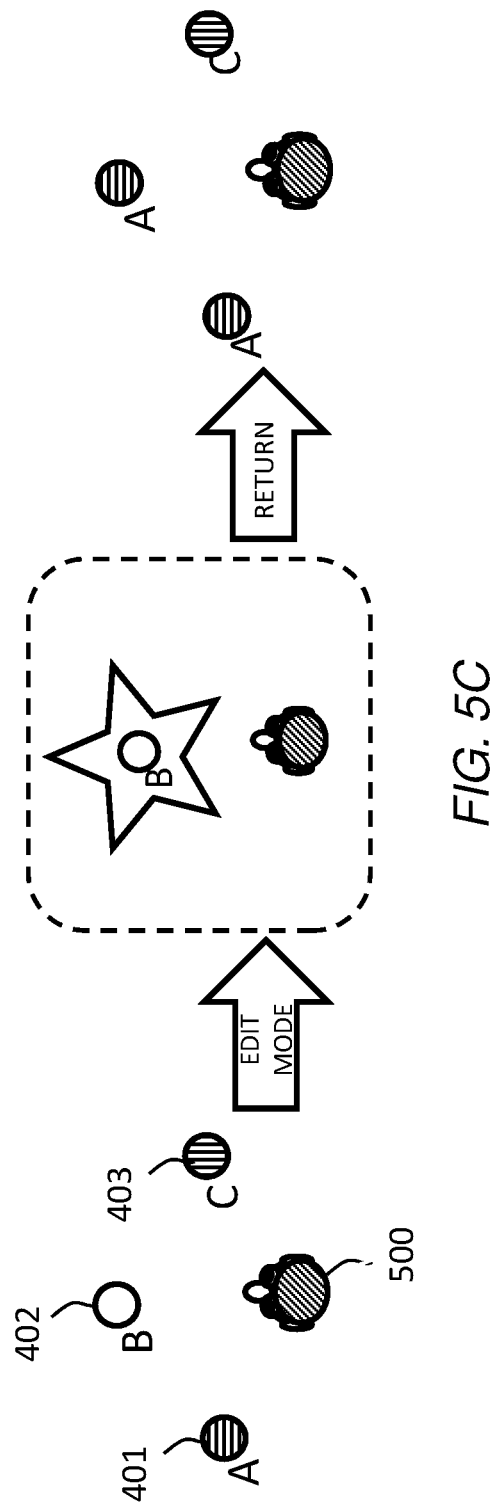

FIG. 5C provides an example whereby the user 500 may enter the editing mode and, in an inclusive editing mode, can see that an audio object 402 which is of interest is allocated to a second priority level B in the order. By selection or dragging of said audio object 402, it may be promoted to the first, highest priority level A in the order.

In some embodiments, the selection or flagging of an audio source may result in the system maintaining the audio source in the priority order or group according to the current position. When the user 500 moves to a new position, and the audio object may be, by default, demoted, but it may now remain on the previous layer as a result of the selection. However, in other embodiments, the object may be allowed to move to a higher-priority layer.

Similarly, if user 500 indicates selects or flags an audio object as undesirable, the system can maintain the audio object, at best, in the priority order or group according to the current position. When the user 500 moves to a new position, the audio object is not promoted to a higher layer even if it would be by default. It may be made lower. An exception may be where the audio object currently has the highest priority or is in the highest priority group. It may not always be desirable to let the user 500 modify the audio rendering so much that audio data representing or corresponding to key audio will be missing from a rendering. However, this is also possible.

Because the original allocation data, prior to editing, may be thematic, the thematic connection may be provided in the metadata. Thus, a user 500 manipulating a certain audio object may at least in some embodiments result in the same priority modification being applied also to the thematically-connected audio sources according to the metadata.

In some example embodiments, the user 500 need not enter a specific editing mode. Rather, the user 500 may react to changes in the audio content that is being presented. For example, the user 500 may indicate an audio source of interest and thusly increase its importance for the user. In some examples, it can then be visualized to the user 500 whether they may wish to re-prioritize said audio object, e.g. to promote it to a higher priority. For example, the user 500 may begin hearing new audio data in a new position and indicate a direction corresponding to the audio object associated with said new audio data. If this is a high-priority audio object (such as an audio object that is part of all perceptual scope baseline renderings in the area) nothing need happen. If the audio object is a low-priority audio object, the user 500 may indicate that they have now changed the rendering (not at the current position but at a new position or time, i.e., whenever the order will change.)

In other example embodiments, the change in the audio data may be indicated to a user 500 when the change relates to a change in perceptual scoping, e.g., an audio object being demoted from a high-priority order to a low-priority order due to user movement. An "earcon", e.g. a bleep, may be provided to the user 500 to indicate that there is a change that may affect the rendering in an undesired way. The provided content data may include metadata relating to an audio object that defines that an earcon is to be played to the user 500 for user movement that would result, if user continues said movement, in the audio object being dropped from the user rendering. The user may then respond to the earcon, which results in a dynamic re-prioritization of the audio object. For example, the audio object may be moved from layer B to layer A in the perceptual scoping.

In other example embodiments, the user 500 may in the editing mode indicate a layer where newly heard audio objects (that the user selects) are allocated. Thus, the user 500 may collect audio objects into a priority basket. This user collection may behave such that each allocated audio object is at least prioritized for the user 500.

The user-controlled prioritization or layering is implemented mainly in a renderer or presentation engine software or device, such as the virtual reality media player 100. In some implementations, the user preference may be captured onto a specific separate layer. Thus, it need not be one of the priority levels or groups signalled as part of the content (i.e. in the received metadata). In this case, the user may set the importance of the user preference layer relative to the default levels, groups or layers. It may not be possible to make the user preference layer more important than the default highest-priority level. However, user 500 may set for the user preference layer, e.g., the same priority level as for level B or C, for example.

In some embodiments, the user preference level or layer "position", relative to the default level or layer, may be used to direct downloading. For example, the virtual reality system 10 and/or virtual reality media player 100 may request more resources (in terms of bandwidth and/or rendering power) in order to provide at least rendering according to level indicated by the user preference layer to the user, e.g. up to level B or C.

In some embodiments, the levels or layers may be constituted at least in part such that they can more efficiently be compressed.

Figure 6:
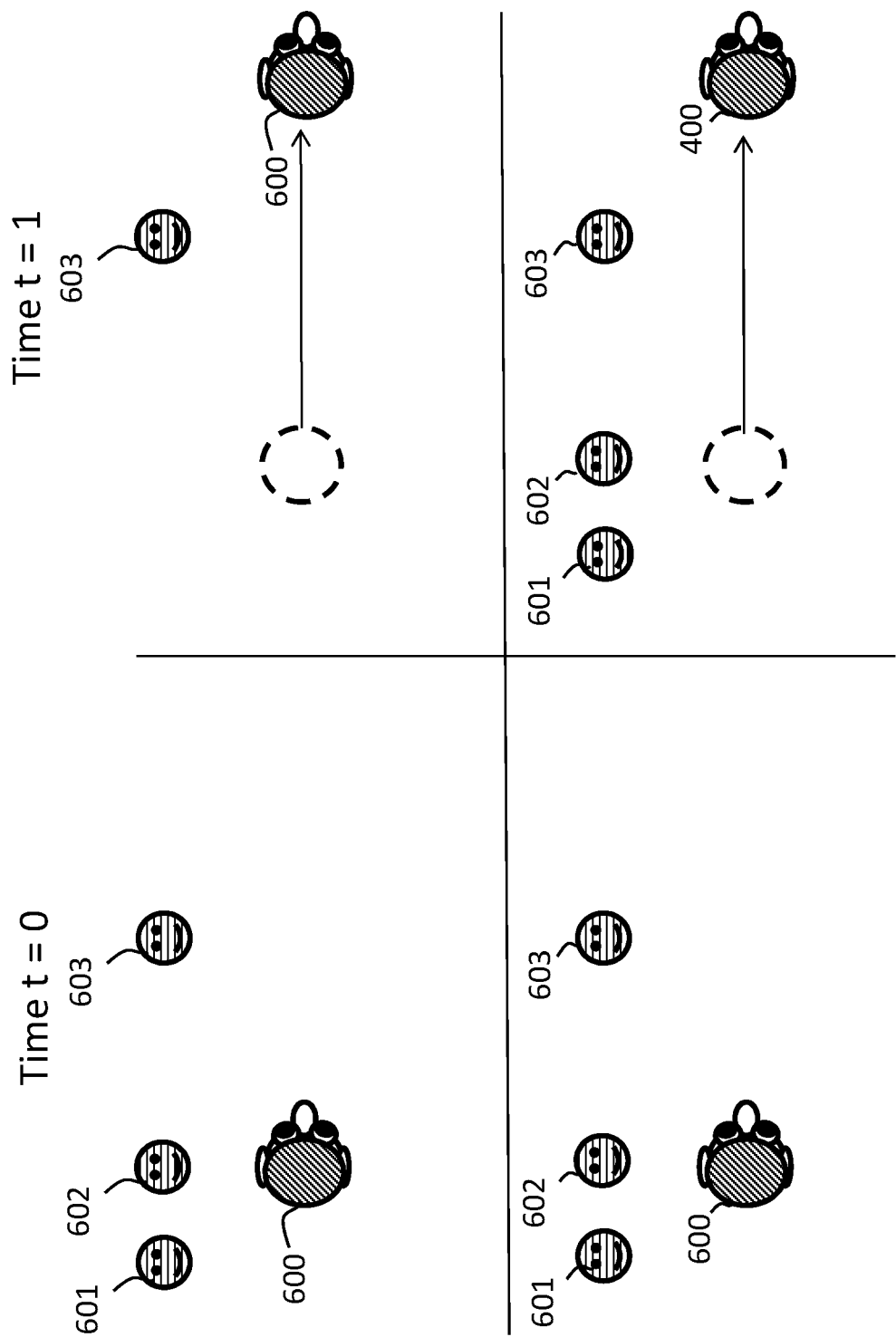
FIG. 6 shows top plan schematic views of a user in relation to virtual objects showing results when methods according to example embodiments are and are not employed.

FIG. 6 illustrates a user 600 walking in 6DoF in a virtual space without and with an example embodiment method enabled. It is understood here that at least some level of system and/or renderer constraint are in place. Also, there can be other audio that is not illustrated in FIG. 9. In the top half of FIG. 6, movement of the user 600 may result in two audio sources 601, 602 not being rendered, even though they may be involved in a conversation with the third audio source 603. In the bottom half of FIG. 6, in accordance with some example embodiments, all three audio sources 601-603 are rendered as a result of the audio sources being allocated to the same priority group or level.

Figure 7:
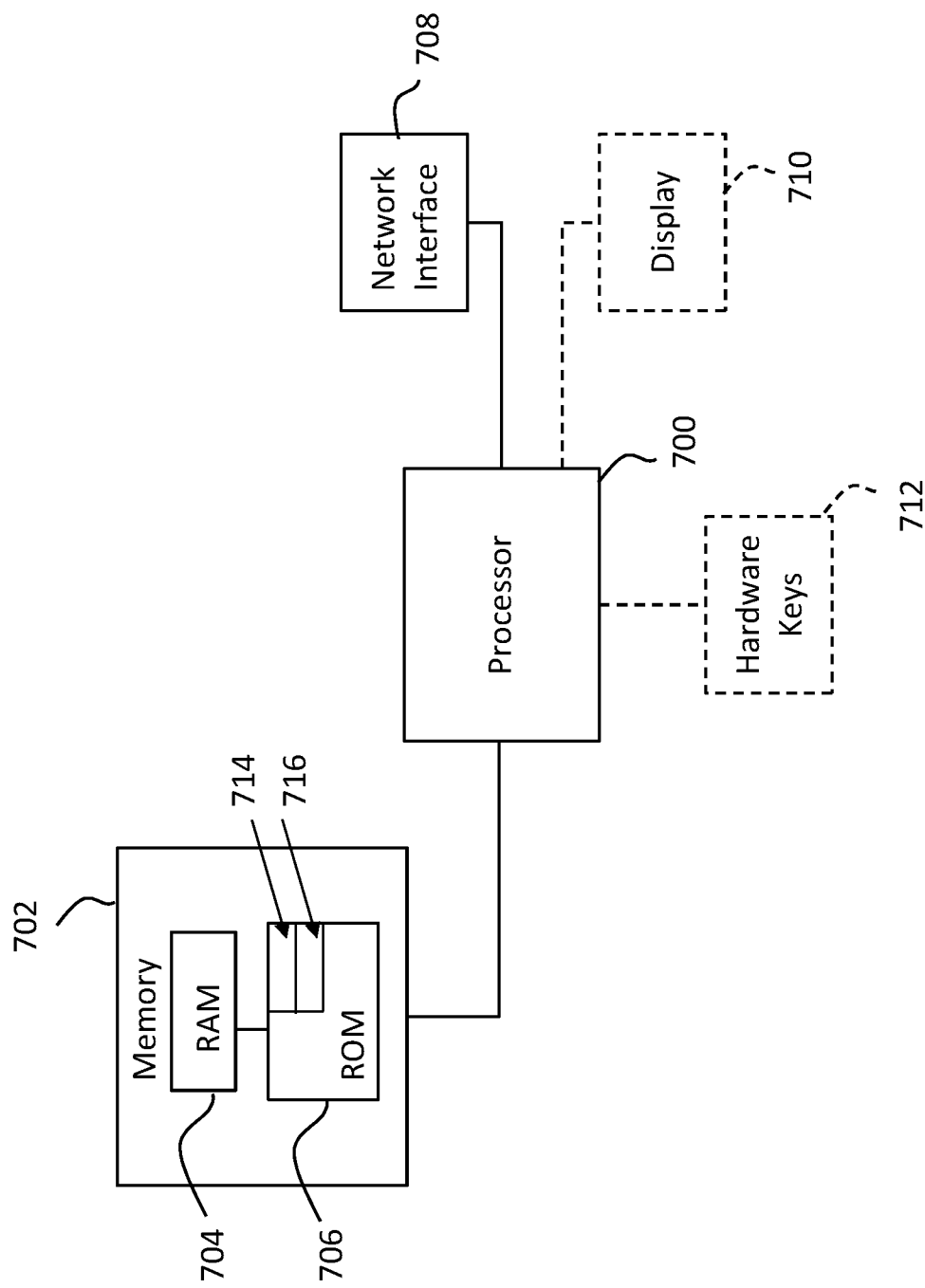
FIG. 7 is a block diagram showing components of an apparatus according to example embodiments.

FIG. 7 is a schematic view of an apparatus which may provide the virtual reality system 100 shown in FIG. 2. It may alternatively provide the content provider system 230 in FIG. 2.

The apparatus may have a processor 700, a memory 702 closely-coupled to the processor and comprised of a RAM 704 and ROM 706. The apparatus may comprise a network interface 708, and optionally a display 710 and one or more hardware keys 712. The apparatus may comprise one or more such network interfaces 708 for connection to a network, e.g. a radio access network. The one or more network interfaces 708 may also be for connection to the internet, e.g. using WiFi or similar. The processor 700 is connected to each of the other components in order to control operation thereof.

The memory 702 may comprise a non-volatile memory, a hard disk drive (HDD) or a solid state drive (SSD). The ROM 706 of the memory stores, amongst other things, an operating system 714 and may store one or more software applications 716. The RAM 704 of the memory 702 may be used by the processor 700 for the temporary storage of data. The operating system 714 may contain code which, when executed by the processor 700, implements the operations as described below, for example in the various flow diagrams. As mentioned below, the memory 702 may comprise any suitable form, and may even be implemented in the cloud.

The processor 700 may take any suitable form. For instance, the processor 700 may be a microcontroller, plural microcontrollers, a microprocessor, or plural microprocessors and the processor may comprise processor circuitry.

Figure 8:
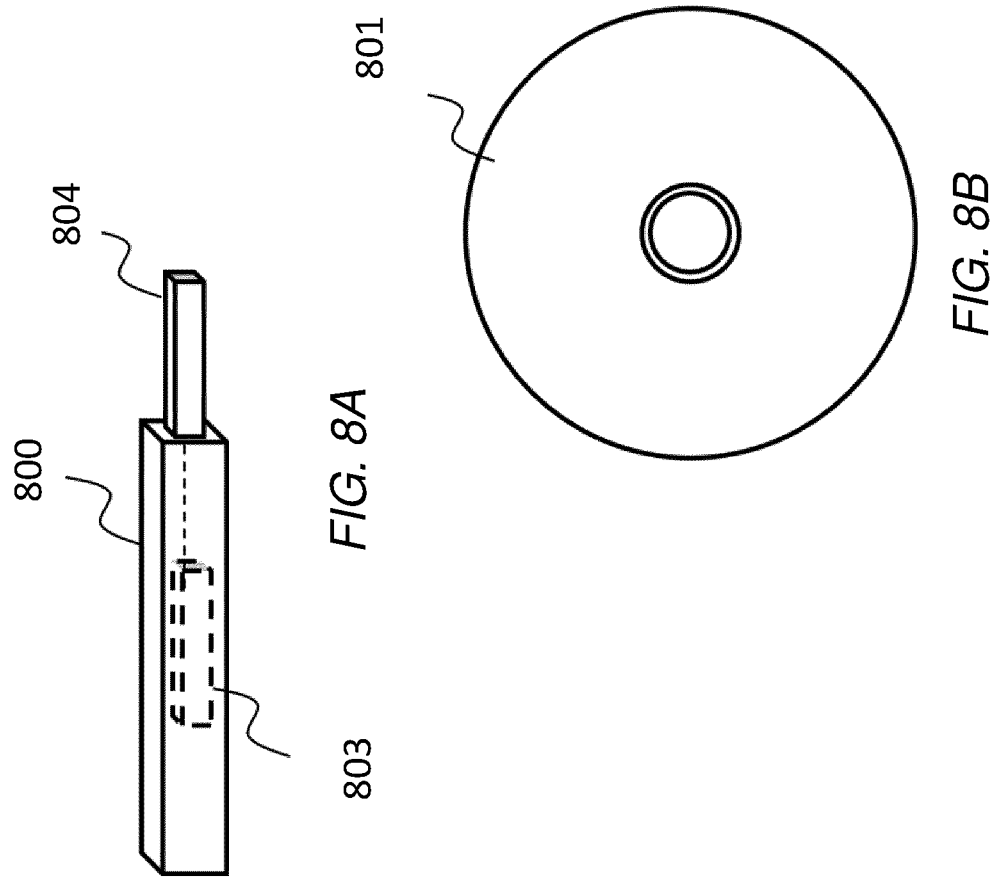
FIGS. 8A and 8B show examples of non-volatile media according to example embodiments.

FIG. 8A and FIG. 8B show tangible non-volatile media, respectively a removable memory unit 800 and a compact disc (CD) 801, each storing computer-readable code which when run by a computer may perform methods according to example embodiments described above. The removable memory unit 800 may be a memory stick, e.g. a USB memory stick, having internal memory 803 storing the computer-readable code. The internal memory 803 may be accessed by a computer system via a connector 804. The CD 801 may be a CD-ROM or a DVD or similar. Other forms of tangible storage media may be used.

Figure 9:
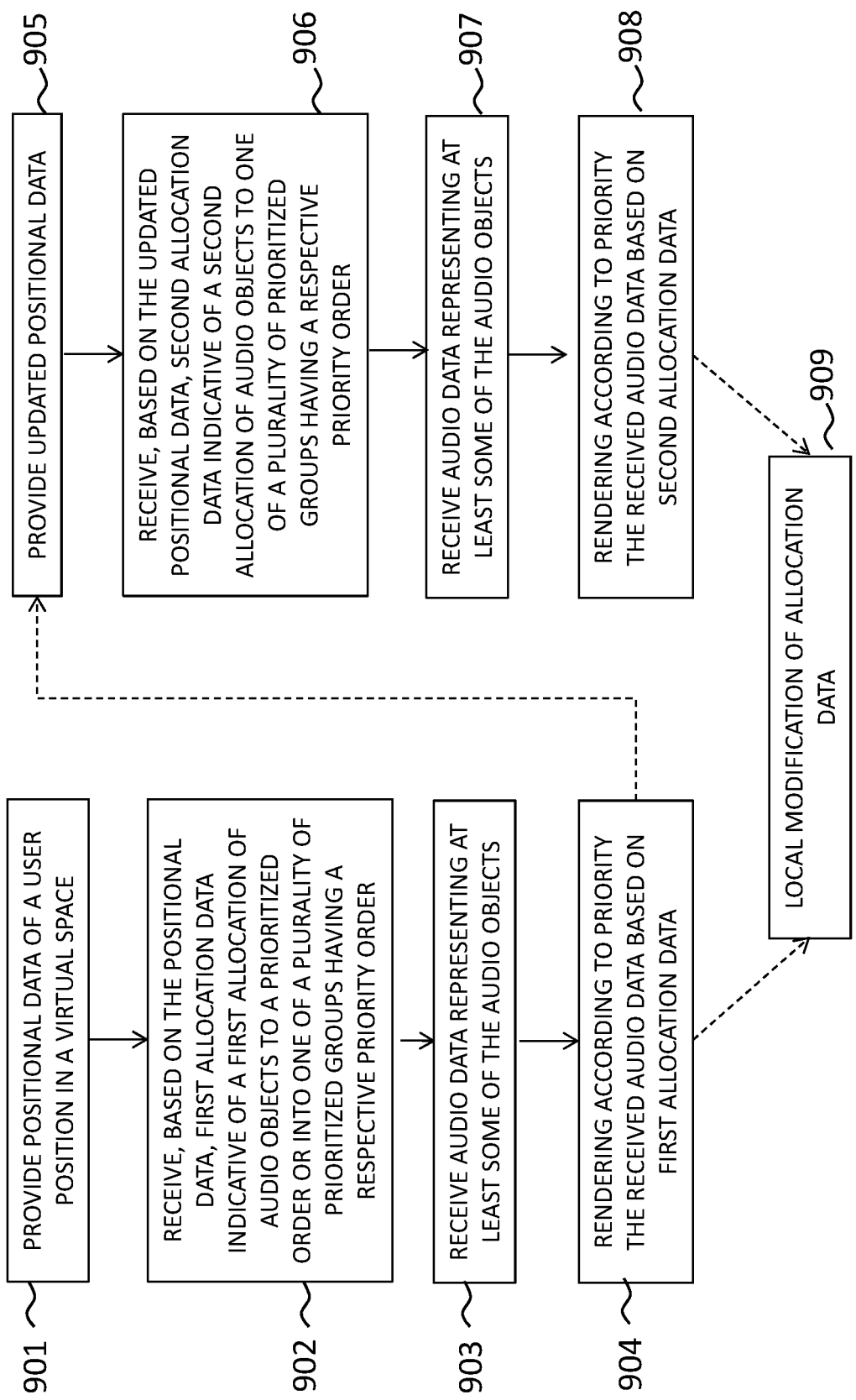
FIG. 9 is a flow diagram showing processing operations that may be performed according to example embodiments.

FIG. 9 is a flow diagram indicating processing operations according to some example embodiments. These operations may be performed by hardware, software, firmware or any combination thereof.

A first operation 901 may comprise providing positional data of user position in a virtual space.

A second operation 902 may comprise receiving, based on the positional data, first allocation data indicative of a first allocation of audio objects to a prioritized order or into one of a plurality of prioritized groups having a respective priority order.

A third operation 903 may comprise receiving audio data representing at least some of the audio objects.

A fourth operation 904 may comprise rendering according to priority the received audio data based on the first allocation data.

Optionally, one or more further operations may be performed.

For example, a fifth operation 905 may comprise providing updated positional data.

A sixth operation 906 may comprise receiving, based on the updated positional data, second allocation data indicative of a second allocation of audio objects to a prioritized order or into one of a plurality of prioritized groups having a respective priority order.

A seventh operation 907 may comprise receiving audio data representing at least some of the audio objects.

An eighth operation 908 may comprise rendering according to priority the received audio data based on the second allocation data.

A ninth operation 909, which may be performed subsequent to operations 904, 908, may comprise performing local modification of allocation data, meaning that the default allocations may be modified either at the user end of the network or are caused to be modified by user end of the network.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some example embodiments may be implemented in the cloud and utilize virtualized modules.

Example embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising at least one processor; and at least one memory including computer program code; the at least one memory and the computer program code configured to, with the at least one processor, cause the apparatus at least to perform:
    provide first positional data indicative of a first user position in a virtual space which comprises a plurality of audio objects;
    receive, based at least partially on the first positional data, first allocation data indicative of a first allocation of the audio objects into a prioritized order or into one of a plurality of prioritized groups in which each group has a respective priority order;
    receive audio data associated with at least some of the audio objects;
    render the received audio data for at least some of the audio objects associated with the received audio data, based on the first allocation data, in which audio objects with a higher priority or in a higher priority group are rendered with priority over audio objects allocated with a lower priority or in a lower priority group;
    provide updated positional data indicative of one or more of a second, different, user position;
    receive, based on the updated positional data, second allocation data indicative of a second, different allocation of the audio objects into a different prioritized order or into prioritized groups whereby at least one object present in a first group for the first allocation is changed to a second group for the second allocation; and
    render the received audio data based on the second allocation data.

2. The apparatus of claim 1, wherein at least one of the received first allocation data or the received second allocation data allocates audio objects of a corresponding type to a common priority group.

3. The apparatus of claim 2, wherein the at least one of the received first allocation data or the received second allocation data allocates audio objects comprising speech related to a conversation to a common priority group such that either all or no audio objects are rendered, depending on whether said common priority group is able to be rendered or not.

4. The apparatus of claim 1, wherein the at least one memory and the computer program code are further configured to, with the at least one processor, cause the apparatus to perform:
    enable local modification of at least one of the received first allocation data or the received second allocation data to modify the allocation of audio objects in the prioritized order or within the prioritized groups from that indicated by the at least one of the received first or second allocation data.

5. The apparatus of claim 4, wherein the at least one memory and the computer program code are further configured to, with the at least one processor, cause the apparatus to perform:
    receive data representing one or more characteristics of a region in the virtual space corresponding to the current user position; and
    modify locally at least one of the received first allocation data or the received second allocation data dependent at least partially on the one or more characteristics.

6. The apparatus of claim 5, wherein the data representing one or more characteristics of the region represents one or more of a distance of one or more audio objects from the user position, a presence of an obstruction in the virtual space, a type of obstruction in the virtual space, reverberation characteristics or noise levels.

7. The apparatus of claim 4, wherein the at least one memory and the computer program code are further configured to, with the at least one processor, cause the apparatus to perform:
    provide an editing mode in which a user interface is presented indicating the audio objects and their respective prioritized order or group allocation; and
    receive one or more user inputs to change the prioritized order of at least one audio source or change it from a first group to a second group.

8. The apparatus of claim 7, wherein the user interface further comprises a paused version of the virtual space rendered to the user at a time when the editing mode is selected, the user interface including visual representations of the audio objects in the virtual space, and wherein the one or more user inputs are gesture or drag-based inputs for modifying the allocation.

9. The apparatus of claim 4, wherein the at least one memory and the computer program code are further configured to, with the at least one processor, cause the apparatus to perform:
  identify one or more audio objects as being of interest to the user, based on one or more of user behaviour and context when consuming the virtual space; and
  setting the allocation of said one or more audio objects to the same or to a higher priority order or group for other positions such that they will continue to be rendered.

10. The apparatus of claim 1, wherein the at least one memory and the computer program code are further configured to, with the at least one processor, cause the apparatus to perform:
  provide the positional data to a remote device over a network and the data indicative of the allocation(s) of audio objects is metadata received with the audio data from the remote device, or caused to be sent by the remote device, over the network.

11. A method comprising:
  providing first positional data indicative of a first user position in a virtual space which comprises a plurality of audio objects;
  receiving, based at least partially on the first positional data, first allocation data indicative of a first allocation of the audio objects into a prioritized order or into one of a plurality of prioritized groups in which each group has a respective priority order;
  receiving audio data associated with at least some of the audio objects;
  rendering the received audio data for at least some of the audio objects associated with the received audio data, based on the first allocation data, in which audio objects with a higher priority or in a higher priority group are rendered with priority over audio objects allocated with a lower priority or in a lower priority group;
  providing updated positional data indicative of one or more of a second, different, user position;
  receiving, based on the updated positional data, second allocation data indicative of a second, different allocation of the audio objects into a different prioritized order or into prioritized groups whereby at least one object present in a first group for the first allocation is changed to a second group for the second allocation; and
  rendering the received audio data based on the second allocation data.

12. The method of claim 11, wherein at least one of the received first allocation data or the received second allocation data allocates audio objects of a corresponding type to a common priority group.

13. The method of claim 12, wherein at least one of the received first allocation data or the received second allocation data allocates audio objects comprising speech related to a conversation to a common priority group such that either all or no audio objects are rendered, depending on whether said common priority group is able to be rendered or not.

14. The method of claim 11, further comprising:
  enabling local modification of at least one of the received first allocation data or the received second allocation data to modify the allocation of audio objects in the prioritized order or within the prioritized groups from that indicated by the at least one of the received first or second allocation data.

15. The method of claim 14, further comprising:
  receiving data representing one or more characteristics of a region in the virtual space corresponding to the current user position; and
  modifying locally at least one of the received first allocation data or the received second allocation data dependent at least partially on the one or more characteristics.

16. The method of claim 15, wherein the data representing one or more characteristics of the region represents one or more of a distance of one or more audio objects from the user position, a presence of an obstruction in the virtual space, a type of obstruction in the virtual space, reverberation characteristics, or noise levels.

17. The method of claim 14, further comprising:
  providing an editing mode in which a user interface is presented indicating audio objects and their respective prioritized order or group allocation; and
  receiving one or more user inputs to change the prioritized order of at least one audio source or change it from a first group to a second group.

18. A non-transitory computer readable medium comprising program instructions for causing an apparatus to perform at least the following:
  providing first positional data indicative of a first user position in a virtual space which comprises a plurality of audio objects;
  receiving, based at least partially on the first positional data, first allocation data indicative of a first allocation of the audio objects into a prioritized order or into one of a plurality of prioritized groups in which each group has a respective priority order;
  receiving audio data associated with at least some of the audio objects;
  rendering the received audio data for at least some of the audio objects associated with the received audio data, based on the first allocation data, in which audio objects with a higher priority or in a higher priority group are rendered with priority over audio objects allocated with a lower priority or in a lower priority group;
  providing updated positional data indicative of one or more of a second, different, user position;
  receiving, based on the updated positional data, second allocation data indicative of a second, different allocation of the audio objects into a different prioritized order or into prioritized groups whereby at least one object present in a first group for the first allocation is changed to a second group for the second allocation; and
  rendering the received audio data based on the second allocation data.

* * * * *